US012686369B1

(12) United States Patent
Frea

(10) Patent No.: US 12,686,369 B1
(45) Date of Patent: Jul. 21, 2026

(54) VEHICLE BRAKING CONTROL SYSTEM

(71) Applicant: Faiveley Transport Italia S.P.A.,
Piossasco (IT)

(72) Inventor: Matteo Frea, Cantalupa (IT)

(73) Assignee: **FAIVELEY TRANSPORT ITALIA
S.P.A.**, Piossasco (IT)

( * ) Notice: Subject to any disclaimer, the term of this
patent is extended or adjusted under 35
U.S.C. 154(b) by 0 days.

(21) Appl. No.: 19/038,160

(22) Filed: Jan. 27, 2025

(51) Int. Cl.
B60T 8/17 (2006.01)
B60T 8/172 (2006.01)
(Continued)

(52) U.S. Cl.
CPC ............ B60T 8/1705 (2013.01); B60T 8/172
(2013.01); B60T 17/006 (2013.01); **B60T
17/228 (2013.01); B61H 5/00** (2013.01);
B61H 11/00 (2013.01); B61L 23/02 (2013.01);
F16D 65/0037 (2013.01); B60T 2210/32
(2013.01);
(Continued)

(58) Field of Classification Search
CPC ...... B60T 8/1705; B60T 8/172; B60T 17/006;
B60T 17/18; B60T 17/22; B60T 17/221;
B60T 17/228; B60T 2210/32; B60T
2220/04; B60T 2270/402; B60T
2270/403; B60T 2270/406; B60T
2270/408;
(Continued)

(56) References Cited

U.S. PATENT DOCUMENTS 3,447,647 A * 6/1969 Stipanovic ............... B61H 1/00
188/74
3,517,784 A * 6/1970 Clemmons ......... B61H 15/0092
188/196 A
(Continued)

FOREIGN PATENT DOCUMENTS

CN 207644409 U 7/2018
CN 110539741 A 12/2019
(Continued)

OTHER PUBLICATIONS

International Search Report and Written Opinion for corresponding
PCT Application No. PCT/IB2023/057556, dated Nov. 6, 2023.

*Primary Examiner* — John M Zaleskas
(74) *Attorney, Agent, or Firm* — K&L Gates LLP

(57) ABSTRACT
A braking control system for a vehicle system includes a first
control circuit configured to receive a first signal indicative
of a requested snow-braking application, and to generate a
snow-braking application command responsive thereto. The
system also includes a second control circuit configured to
control at least one braking device to apply the requested
snow-braking application to the vehicle system, responsive
to receiving the snow-braking application command from
the first control circuit. The first control circuit is also
configured to receive an actual braking signal indicative of
an actual braking that is applied by the braking device to the
vehicle system in response to the snow-braking application
command, to compare the actual braking with the requested
snow-braking application, and to determine that the
requested snow-braking application has not been properly
applied when the actual braking does not correspond with
the requested snow-braking application within designated
parameters.

20 Claims, 4 Drawing Sheets

(51) Int. Cl.

| | |
|---|---|
| *B60T 17/00* | (2006.01) |
| *B60T 17/22* | (2006.01) |
| *B61H 5/00* | (2006.01) |
| *B61H 11/00* | (2006.01) |
| *B61L 23/02* | (2006.01) |
| *F16D 65/00* | (2006.01) |

(52) U.S. Cl.
  CPC ..... *B60T 2220/04* (2013.01); *B60T 2270/402* (2013.01); *B60T 2270/406* (2013.01)

(58) Field of Classification Search
  CPC ....... F16D 65/0037; B61H 5/00; B61H 11/00; B61L 23/02
  See application file for complete search history.

(56) References Cited

U.S. PATENT DOCUMENTS

| | | | | |
|---|---|---|---|---|
| 4,334,711 A | * | 6/1982 | Mazur .................... | B60T 17/18 188/198 |
| 4,364,610 A | * | 12/1982 | Williams ............. | B60T 13/665 188/83 |
| 4,498,711 A | * | 2/1985 | Langley .................. | B60T 17/18 303/1 |
| 2017/0197597 A1 | * | 7/2017 | Grunwald ............. | B61H 11/00 |
| 2018/0229698 A1 | * | 8/2018 | Salmon .................... | B60T 7/12 |
| 2020/0156604 A1 | * | 5/2020 | Liu ....................... | B60T 13/665 |
| 2025/0153699 A1 | * | 5/2025 | Prim .................... | B60T 8/1705 |

FOREIGN PATENT DOCUMENTS

| | | | | | |
|---|---|---|---|---|---|
| DE | 102018222330 A1 | * | 6/2020 | ............. | B60T 17/221 |
| DE | 102019004964 A1 | | 1/2021 | | |
| EP | 3744594 A1 | | 12/2020 | | |
| JP | 07025331 A | * | 1/1995 | | |
| JP | H0725331 A | | 1/1995 | | |
| WO | WO-2009118350 A2 | * | 10/2009 | ............ | B60T 17/228 |
| WO | WO-2016041760 A1 | * | 3/2016 | ............. | B60T 17/22 |
| WO | WO-2023174575 A1 | * | 9/2023 | ............ | B60T 17/006 |
| WO | 2024023716 A1 | | 2/2024 | | |

* cited by examiner

VEHICLE BRAKING CONTROL SYSTEM

CROSS-REFERENCE TO RELATED APPLICATIONS

This application is a continuation-in-part of International Application PCT/IB2023/057556 filed 26 Jul. 2023, which claims priority to IT102022000015882 filed 27 Jul. 2022, both incorporated by reference herein.

BACKGROUND

Technical Field

Embodiments relate to vehicle braking control systems. Other embodiments relate to vehicle snow-brake control systems.

Discussion of Art

In the vehicle sector, "snow-brake" braking (or "snow-braking") refers to the application of braking with limited force and duration. This braking is applied for the purpose of preventing the formation of ice and/or snow deposits on a braking device (or associated component) of the vehicle, for example on the braking application means of the braking device, or for removing ice or snow from such devices or components. Thus, snow-braking is not for purposes of slowing the vehicle, but rather for ice and/or snow mitigation (accumulation prevention, or removal).

In one example, the braking device may be a pneumatic, or electropneumatic, or mechanical, or electromechanical brake, etc. The braking application means of the braking device may, for example, be a brake shoe suitable for applying a braking force to the wheel, or a pad suitable for applying a braking force to a braking component, for example, a disc, associated with a wheel of the vehicle or associated with an axle associated with at least one wheel.

FIG. 1 shows an exemplifying situation wherein snow and/or ice 100 has accumulated on a brake shoe 102 of a braking device 104. Snow and ice 100, under certain environmental conditions, may accumulate on the braking device, for example, on the braking application means 102 (for example, on the brake shoe or on the pad and/or disc, or on the caliper). In some other cases, snow and/or ice 100 may also accumulate on the wheel 106 or the axle whereto the wheel 106 is coupled.

In the following, reference will be made to the railway vehicle sector. What is being described may, however, also apply to vehicles in other fields.

When the vehicle is a vehicle in the railway sector (i.e., a rail vehicle), with regard to the definition of the safety integrity level SIL, reference may be made to European standards EN50129, EN50159, EN 50126-1, EN 50126-2, EN 50128, according to the latest update available on the filing date of the present application, where:

EN50126 ("Railway applications. The specification and demonstration of reliability, availability, maintainability and safety (RAMS)").

EN50128 ("Railway applications. Communications, signaling and processing systems. Software for railway control and protection systems").

EN50129 ("Railway applications. Communication, signaling and processing systems. Safety-related electronic systems for signaling").

EN50159 ("Railway applications. Communication, signaling and processing systems. Safety-related communication in transmission systems").

In particular, the EN50126 standard defines the methodologies for assigning the SIL0/1/2/3/4 safety levels (with safety integrity level SIL4 indicating the maximum safety integrity level) to the subsystems making up the system in question, based on the results of the Safety Analysis, and the standards EN50128 and EN50129 define the design criteria to be applied to the software and hardware components, respectively, based on the SIL levels assigned based on said Safety Analysis results.

A control circuit, a device, a unit or module, etc., may be considered implemented according to a high safety integrity level when made at least according to a SIL>=3 safety integrity level.

As may be observed in FIG. 2, in the prior art, snow-brake braking is managed by a control circuit 200 that is also configured to manage and control the service braking. Such control circuit 200 is implemented according to a low safety integrity level (SIL≤2).

Since snow-brake braking is managed at a low safety integrity level, it may be subject to a higher probability of malfunction and the risk that such a malfunction will go undetected. Failure to apply snow-brake braking, due, for example, to a malfunction of the control circuit 200 or the braking device 204 or the braking application means 202 thereof, may result in an undue accumulation of snow or ice on the braking device 204, such as on the braking application means 202, or on the wheel 206 or on the axle associated with the wheel 206. In this case, should it be necessary to apply emergency braking, due to the unexpected presence of snow or ice, the emergency braking may be initially applied in a degraded manner. Only when the snow or ice has been cleared may the expected emergency braking be effectively applied. As a result, the application of degraded emergency braking may negatively impact the performance of said emergency braking, resulting in the lengthening of the equivalent stopping time of the vehicle, despite the fact that the emergency braking is managed according to a high safety integrity level (SIL4).

It may be desirable to provide a solution that improves the safety level with which snow-braking is managed, without impacting the development costs of the systems responsible for managing the service braking and emergency braking.

BRIEF DESCRIPTION

In an embodiment, a braking control system for a vehicle system includes a first control circuit configured to receive a first signal indicative of a requested snow-braking application, and to generate a snow-braking application command responsive thereto. The system also includes a second control circuit configured to control at least one braking device to apply the requested snow-braking application to the vehicle system, responsive to receiving the snow-braking application command from the first control circuit. The first control circuit is also configured to receive an actual braking signal indicative of an actual braking that is applied by the at least one braking device to the vehicle system in response to the snow-braking application command, to compare the actual braking with the requested snow-braking application, and to determine that the requested snow-braking application has not been properly applied when the actual braking does not correspond with the requested snow-braking application (e.g., within designated parameters, such as within a threshold).

In another embodiment, a braking control system for a vehicle system includes a first control circuit and a second control circuit. The first control circuit is configured to receive a first signal indicative of a requested braking application for mitigating ice and/or snow (e.g., reducing or preventing accumulation, and/or removing) on one or more of a wheel of the vehicle system or a braking component associated with the wheel of the vehicle system or associated with an axle coupled to the wheel of the vehicle system. The first control circuit is also configured to generate a second, command signal responsive to receiving the first signal.

The second control circuit is configured to receive the command signal from the first control circuit, and to control a braking system of the vehicle system to apply a first designated degree (e.g., force and/or duration) of braking to the vehicle system to mitigate the ice and/or snow, responsive to receiving the command signal. The first control circuit is further configured to receive an actual braking signal that is indicative of an actual degree of braking that is applied by the braking system to the vehicle system in response to the command signal, to compare the actual degree of braking with the designated degree of braking, and to determine that the requested braking application has not been properly applied when the actual degree of braking does not correspond with the designated degree of braking (e.g., within designated parameters, such as within a threshold).

BRIEF DESCRIPTION OF THE DRAWINGS

The functional and structural features of embodiments of a braking control system will now be described. Reference is made to the accompanying drawings, wherein.

DETAILED DESCRIPTION

Figure 1:
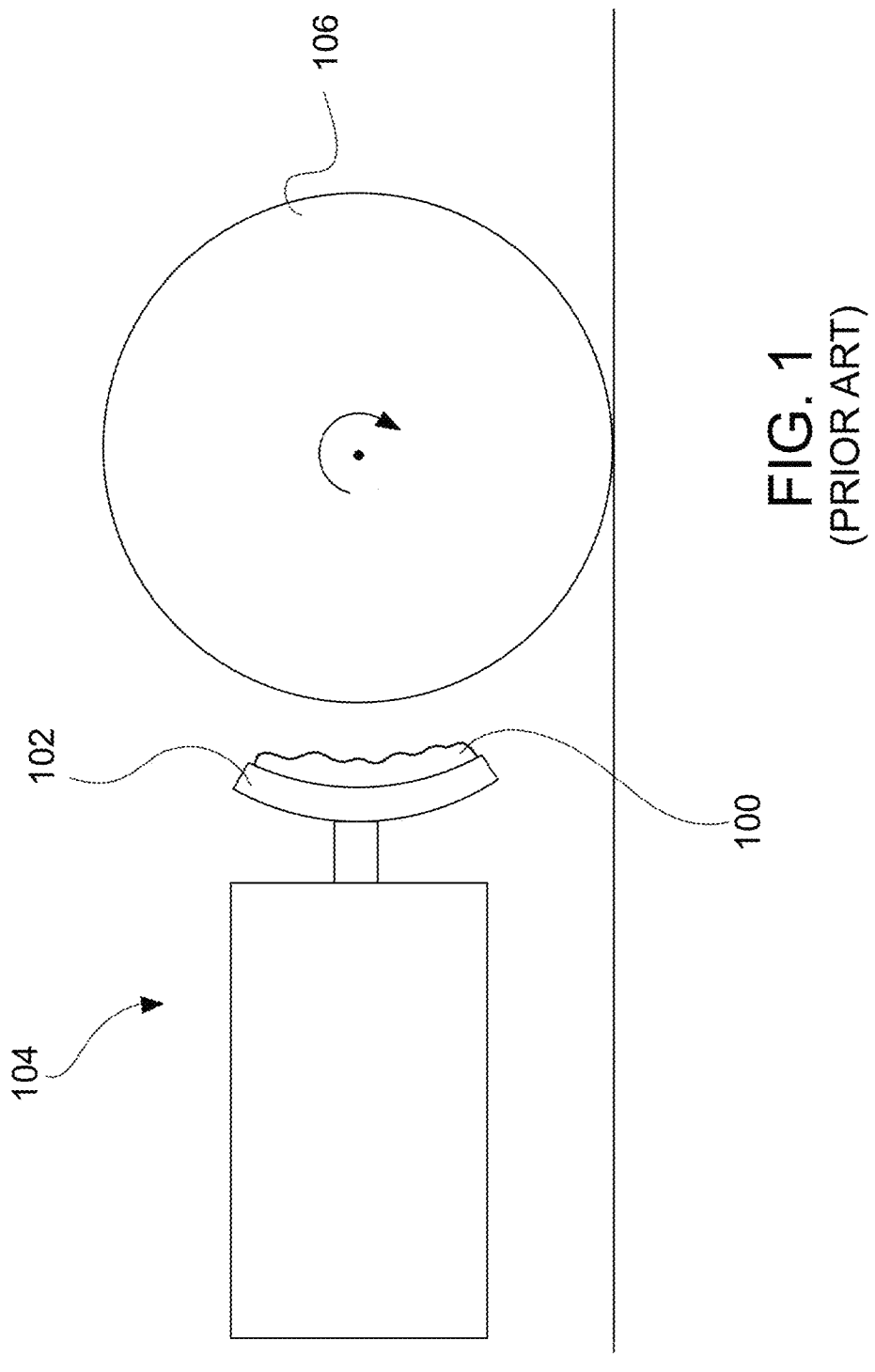
FIG. 1 shows an example of a situation where snow and/or ice has accumulated on a braking application means.
Figure 2:
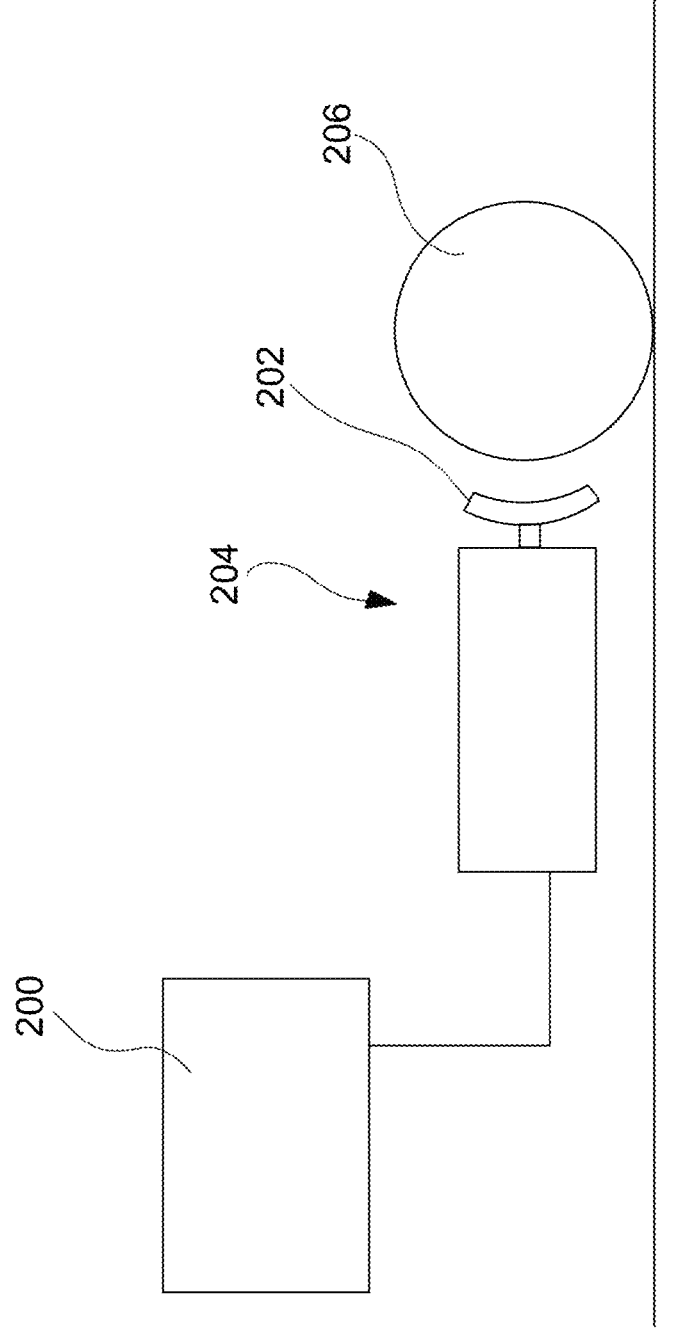
FIG. 2 shows a snow-brake braking control system according to the prior art.
Figure 3:
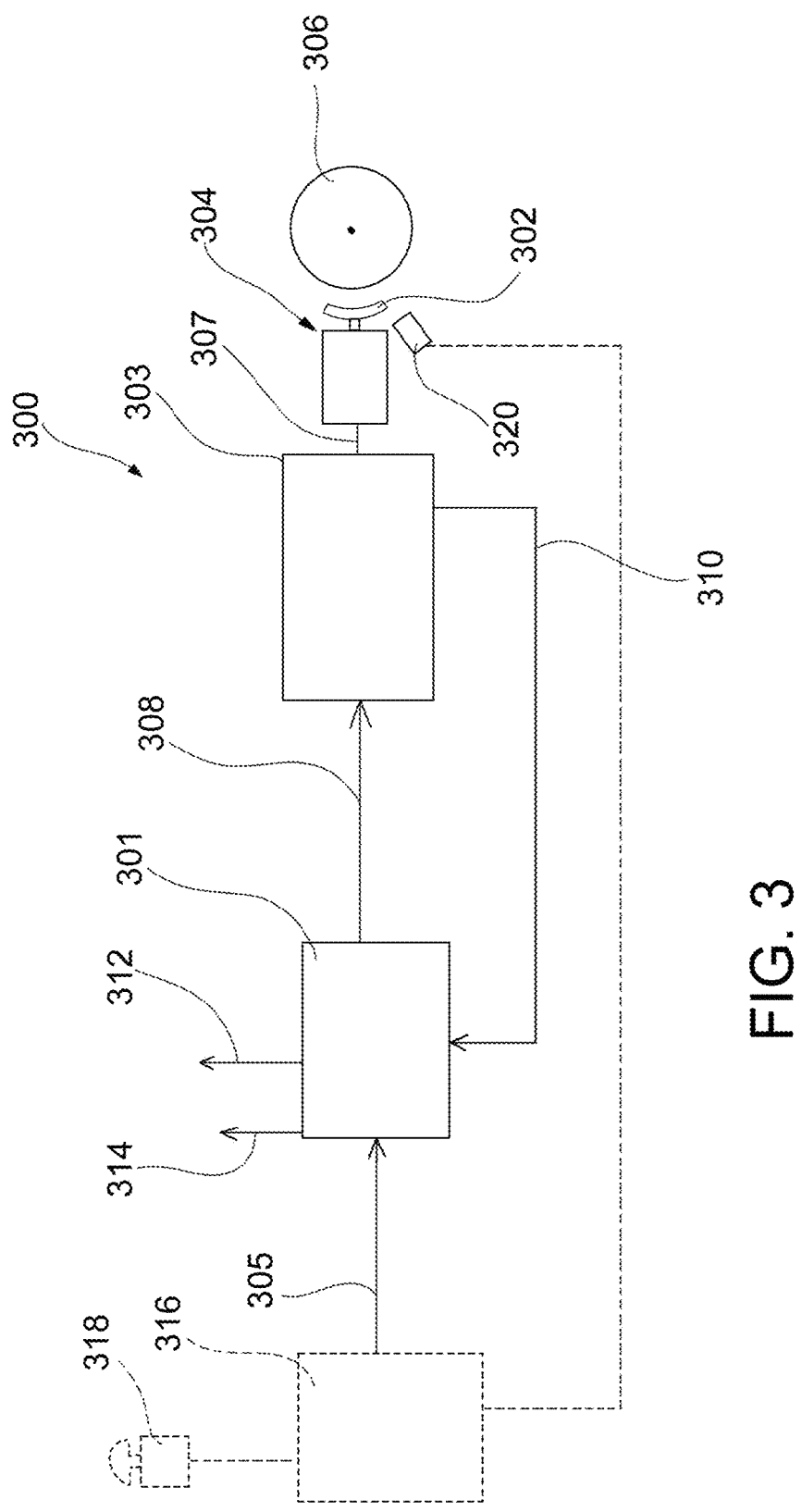
FIG. 3 shows an embodiment of a braking control system according to the present invention.
Figure 4:
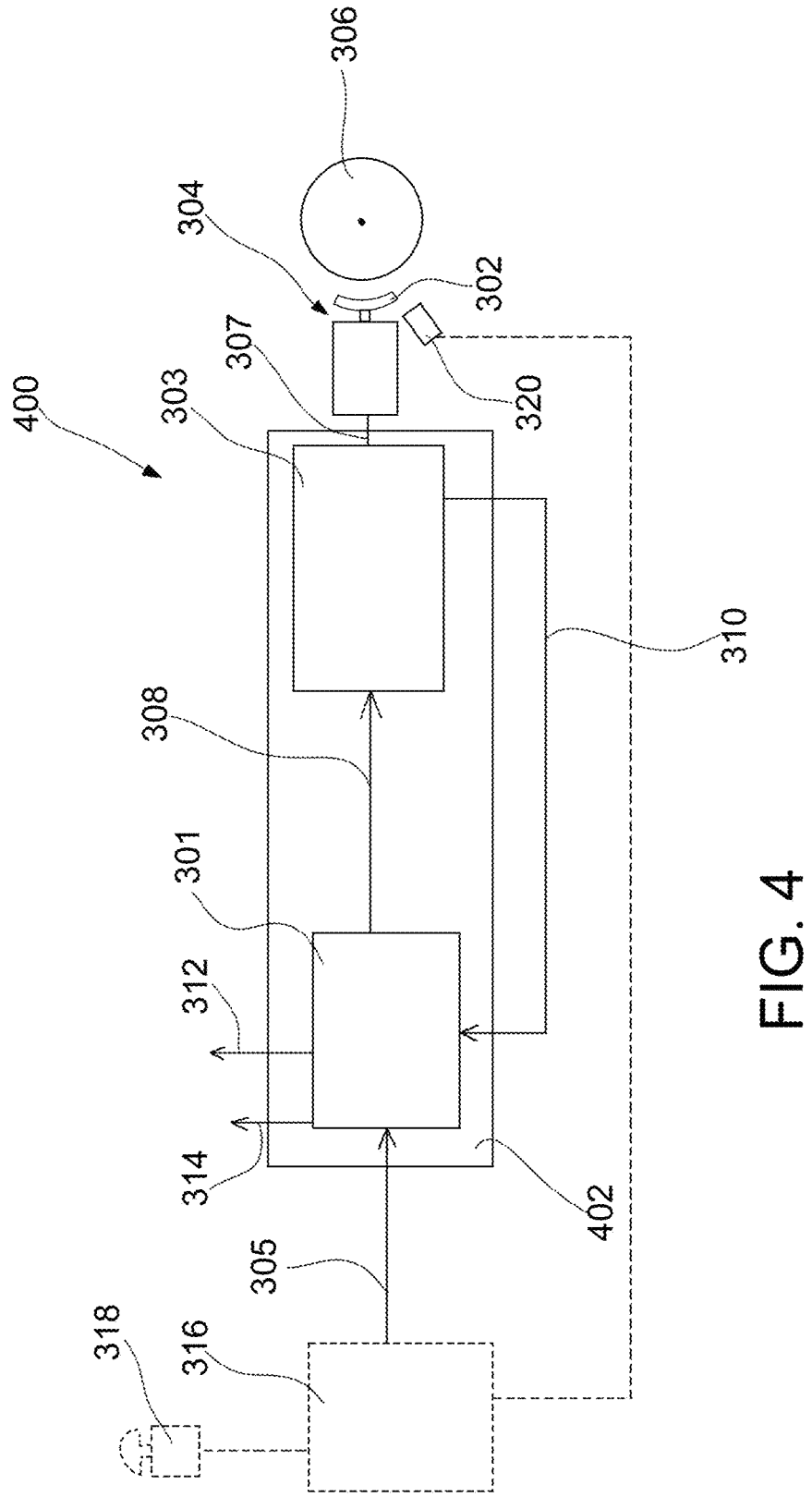
FIG. 4 shows another embodiment of a braking control system.

Referring initially to FIG. 3 and FIG. 4, an embodiment of a braking control system 300, 400 of a vehicle system is described in the following. The vehicle system may include one vehicle, or plural vehicles that are physically or logically connected to travel in coordination along a route, e.g., a group of rail vehicles such as a train.

According to one aspect, the braking control system 300, 400 is configured to carry out a snow-braking operation of the vehicle system (i.e., it controls a braking device for snow-braking of the vehicle system, to mitigate snow/ice accumulation). Snow-brake braking, or just snow-braking for short, is braking that, when applied, is suitable for removing accumulated ice and/or snow on a braking device 304, such as on a braking applicator (or application means) 302 of the braking device 304, and/or on a wheel 306 of the vehicle system and/or on a braking component associated with a wheel of the vehicle system or associated with an axle whereto at least one wheel of the vehicle system is coupled. When ice or snow accumulates, it may impair the proper application of the braking force by the braking device 304.

Furthermore, snow-braking may be suitable for preventing the formation of ice and/or the depositing of snow on a braking device 304, such as on a braking applicator 302 of the braking device 304, and/or on a wheel 306 of the vehicle system, and/or on a braking component associated with a wheel of the vehicle system or associated with an axle whereto at least one wheel of the vehicle is coupled.

For example, the braking component may be a brake disc, e.g., attached to the side of a wheel, or attached to an axle. For example, the braking applicator 302 of the braking device 304 may be a brake shoe when it is configured to act directly upon the wheel, or it may be a brake pad when it is configured to act upon the brake disc. Additional types of braking components and braking applicators are, however, applicable to the present invention, e.g., brake drums, calipers, and so on.

During the application of the snow-brake braking force, due to the effect of overheating and/or friction generated by the contact between the braking device 304 and the wheel 306 and/or the braking component associated with a wheel of the vehicle system or associated with an axle (which a wheel of the vehicle is coupled), snow and ice are removed by abrasion or melting (for example). This may also serve to prevent snow or ice from accumulating. For example, the contact between the braking device 304 and the wheel 306 and/or the braking component (associated with a wheel or axle) may occur by means of a movement of the braking applicator 302 of the braking device 304, e.g., a caliper assembly is controlled to press a brake pad against a brake disc attached to a wheel, with friction between the brake pad and brake disc mitigating ice and/or snow accumulation (removing the snow/ice and/or preventing or reducing accumulation).

The control system includes a first control circuit 301 configured to receive a first signal indicative of a requested snow-braking application (that is, the first signal is indicative of a request to perform snow-brake braking 305), and to generate a snow-braking application command 308 responsive to receiving the first signal that is indicative of the request to perform the snow-brake braking 305.

The first signal indicative of a request to perform snow-braking 305 is a signal that is indicative of a desirability, necessity, or other reason to apply snow-brake braking. The snow-braking application command 308 is a signal which is generated in response to the receipt of the first signal and that is generated for the purpose of requesting the application of snow-braking to the vehicle system. For example, to a wheel 306 (or multiple wheels) and/or to the braking component(s) associated with a wheel or wheels of the vehicle system or associated with an axle or axles to which one or more wheels are coupled. Therefore, the snow-braking application command 308 may be a signal to indicate that the braking device 304 (or more generally, a braking system of the vehicle system) is to be operated in order to apply snow-braking of the vehicle system.

In one example, the first signal (indicative of a request to perform snow-braking) 305 and/or the snow-braking application command 308 may be electrical signals. This is also the case for any other signals referenced herein.

In embodiments, the control system 300, 400 further includes a second control circuit 303 that is configured to receive the snow-braking application command 308 from the first control circuit 301, and to request or otherwise control at least one braking device 304 to apply the requested snow-braking application to the vehicle system, responsive to receiving the snow-braking application command (e.g., the at least one braking device is controlled to apply snow-braking to one or more wheels 306 or to one or more braking components associated with one or more wheels or axles of the vehicle system).

In order to request that the at least one braking device 304 of the vehicle system apply snow-brake braking, the second control circuit 303, in response to receiving the snow-braking application command 308, may issue an actuation signal 307. Depending upon the type of braking device 304 (for example pneumatic, electropneumatic, electromechanical), the actuation signal may be a pneumatic actuation signal or an electric actuation signal, etc. For example, the actuation signal may be a pneumatic signal suitable for supplying a pneumatic braking cylinder of the braking device(s) 304 with brake fluid at a given pressure. Or, for example, the actuation signal 307 may be an electrical signal suitable for controlling the opening and closing of an electropneumatic valve that is suitable for regulating the pressure of a brake fluid to be supplied to a pneumatic braking cylinder of the braking device(s) 304.

In embodiments, the first control circuit 301 is further configured to receive an actual braking signal 310 that is indicative of actual braking that is applied by the at least one braking device 304 to the vehicle system (e.g., to wheel(s) 306, or to the braking component associated with the vehicle wheel(s) or associated with the axle(s) coupled to the vehicle wheel(s)) in response to the snow-braking application command 308 generated by the first control circuit 301. The first control circuit 301 is further configured to compare the actual braking indicated by the actual braking signal 310 with the requested snow-brake application, and to determine that the requested snow-braking application has not been properly applied when the actual braking indicated by the actual braking signal does not correspond with the requested snow-braking application.

In other words, the first control circuit 301, through a comparison of the actual braking indicated by the actual braking signal 310 and the requested snow-brake braking (i.e., that which is expected when the braking device 304 correctly applies snow-brake braking) may verify that snow-brake braking has actually been applied. By way of such a comparison, the first control circuit 301 may thereby determine whether the second control circuit 303 and/or the braking device 304 and/or the braking applicator 302 of the braking device 304 is not functioning properly and is not applying the expected degree of snow-braking.

Actual braking that is effectively applied, e.g., by the braking device 304 to the wheel 306 in response to the snow-braking application command 308, which was generated by the first control circuit 301 and was transmitted/received to/from the second control circuit, may be understood to mean the actual braking that was generated as a result of the application of snow-braking that was requested by way of the snow-braking application command 308.

In embodiments, the first control circuit 301, responsive to determining that the snow-braking application has not been properly applied, may also be configured to generate an anomaly or fault signal 312 that is indicative of the determination that the snow-braking application has not been properly applied, and/or to generate an emergency braking request signal 314 indicative of a request to perform emergency braking, e.g., a control system of the vehicle system may be configured to initiate an emergency braking operation of the vehicle system responsive to receiving the emergency braking request signal 314, either generally or if designated vehicle operation conditions are also met.

In embodiments, the first control circuit 301, responsive to determining that the snow-braking application has not been properly applied, may also be configured to generate an additional command signal for the second control circuit to control at least one braking device to re-apply the requested snow-braking application to the vehicle system, either at the same level as the first application or a different, higher level (e.g., longer duration, and/or greater force).

In embodiments, the first control circuit 301 may be implemented according to a first safety integrity level SIL and the second control circuit may be implemented according to a second safety integrity level SIL. The first safety integrity level SIL may be greater than the second safety integrity level SIL. For example, in embodiments, the first control circuit 301 may be implemented according to a first safety integrity level SIL4 and the second control circuit may be implemented according to a second safety integrity level SIL2.

In embodiments, as may be observed in FIG. 3, the first control circuit 301 may be distinct from the second control circuit 303.

Otherwise, as may be observed in FIG. 4, the first control circuit and the second control circuit may be comprised within one single control unit 402. For example, the control unit 402 may be the control unit responsible for controlling all the functions in relation to the braking of such a vehicle system (for example, service braking, emergency braking, parking braking, etc.)

In embodiments, the first control circuit 301 may be configured to determine that the actual braking, as indicated by the actual braking signal 310, does not correspond with the requested snow-braking application when a first actual braking application intensity value differs from a second requested snow-braking application intensity value by at least a designated braking application intensity difference value; and/or when a first actual braking application duration differs from a second requested snow-braking application duration by at least a designated braking application duration difference.

In a numerical example, considering a designated braking application intensity difference value equal to 50N, if the requested snow-braking involves the application of a second braking application intensity value of 200N but the first actual braking application intensity value indicated by the actual braking signal 310 is equal to 100N, the first control circuit 301 may determine that the actual braking, as indicated by the actual braking signal 310, does not correspond to the requested snow-brake braking. If, on the other hand, the snow-braking involves the application of a second braking application intensity value of 200N but the first actual braking application intensity value indicated by the actual braking signal 310 is equal to 190N, the first control circuit 301 will be able to determine that the actual braking indicated by the actual braking signal 310 corresponds to the requested snow-brake braking. In other words, if the actual is within a designated threshold of the requested, no fault is determined, and if the actual is not within the designated threshold of the requested, a fault is determined.

In a further numerical example, considering a predetermined braking application duration difference of 2 seconds, if the requested snow-braking involves the application of a second snow-braking application duration of 10 seconds but the first actual braking application duration, as indicated by the actual braking signal 310, is equal to 6 seconds, the first control circuit 301 may determine that the actual braking, as indicated by the actual braking signal, does not correspond to the requested snow-braking. If, on the other hand, the snow-braking involves the application of a second snow-braking application duration of 10 seconds but the first actual braking application duration, as indicated by the actual braking signal 310, is equal to 9 seconds, the first control circuit 301 may determine that the actual braking, as indicated by the actual braking signal 310, corresponds to the requested snow-braking.

In embodiments, the second control circuit 303 may also be configured to manage the application of the service braking. Service braking, for example in the railway industry, refers to normal operational braking in order to stop one or more rail vehicles (e.g., a signal rail vehicle traveling by itself, or plural rail vehicles coupled together to form a train) and in order to reduce speed thereof.

In embodiments, the first control circuit 301 may also be configured to manage the application of emergency braking. Emergency braking, for example in the railroad industry, refers to a breaking force that is significantly greater when compared to standard service braking. Emergency braking may only be used in designated emergency situations where it is necessary to stop the vehicle as soon as possible. For example, emergency braking may use (apply) the maximum available braking force. Emergency braking may also be braking that is completely separate from conventional service braking and configured to stop the vehicle as quickly as possible.

In embodiments, the first control circuit 301 may be configured to receive, via a communication system, the first signal (indicative of a request to perform the snow-braking 305) from a third control circuit 316. The third control circuit 316 may be included in the vehicle system or may be remote in relation to the vehicle system (for example, located in a remote traffic control station). For example, the communication system may include wired channels, for example a vehicle CAN line or trainline, and/or wireless transceivers, such as wireless Bluetooth™, radios used for distributed power control or the like, or cellular.

In embodiments, the third control circuit 316 may be configured to forward the signal that is indicative of a request to perform the snow-braking 305 to the first control circuit 301 when a driver of the vehicle system operates a control circuit 318, e.g., a designated snow-braking controller, and/or when a snow or ice monitoring system 320 determines that there is ice and/or snow on the braking device 304, or on a wheel(s) 306 of the vehicle system, or on a braking component(s) associated with the wheel of the vehicle system or associated with an axle(s) coupled to the wheel(s) of the vehicle system. For example, the control circuit 318 may be a button, switch, lever, or software button shown on a display. The control circuit 318 may be placed, for example, in a vehicle cabin suitable for accommodating the driver/operator of the vehicle.

For example, the monitoring system 320 may include a sensor device, such as an optical sensor that is configured to acquire infrared or other images or signals, or the like, of the braking applicator or of the wheel or axle. The monitoring system 320 may also be combined with an artificial intelligence and/or machine learning algorithm that is suitable for evaluating images acquired by the monitoring system 320 and to determine whether snow or ice is present. The infrared images or other images or information acquired by the monitoring system 320 may be stored, for example, in a database or memory.

The sensor device may also include a temperature sensor and/or a moisture sensor, to determine if environmental conditions are amenable to ice or snow accumulation. For example, in embodiments, the third control circuit 316 may be configured to forward the first signal indicative of a request to perform snow-braking 305 to the first control circuit 301 when a temperature sensor measures a temperature outside the vehicle system that is below a predetermined temperature threshold. For example, the temperature threshold may be equal to 0° C., reflecting the freezing point of water.

For example, the first signal that is indicative of a request to apply snow-braking 305 and/or the snow-braking application command 308 may be generated or forwarded continuously over time, or only at predetermined time intervals that are spaced apart by a predetermined time interval.

In a further aspect, embodiments of the invention relate to a braking system for a vehicle system. In one embodiment, the braking system includes at least one braking device 304 that is configured to apply snow-brake braking to one or more wheels 306 of the vehicle system or to one or more braking components associated with one or more wheels or axles of the vehicle system. The braking system also includes a control system 300, 400 for the snow-brake braking of vehicle system according to any one of the embodiments described herein. For example, the control system may include a first control circuit and a second control circuit. The first control circuit is configured to receive a first signal indicative of a requested snow-braking application and to generate a snow-braking application command responsive to receiving the first signal. The second control circuit is configured to receive the snow-braking application command from the first control circuit, and to control the at least one braking device to apply the requested snow-braking application to the vehicle system (e.g., to one or more wheels, axles, or braking components of the vehicle system such as brake discs or brake drums), responsive to receiving the snow-braking application command. The first control circuit is further configured to receive an actual braking signal that is indicative of an actual braking that is applied by the at least one braking device to the vehicle system in response to the snow-braking application command generated by the first control circuit, to compare the actual braking that is indicated by the actual braking signal with the requested snow-braking application, and to determine that the requested snow-braking application has not been properly applied when the actual braking indicated by the actual braking signal does not correspond with the requested snow-braking application.

In embodiments, for a requested snow-braking application, the control circuit(s) may be configured to: control a single braking device on a single vehicle only; control plural braking devices for concurrent activation on a single vehicle only; or control plural braking devices located on plural vehicles of a vehicle system for concurrent activation.

In a still further aspect, embodiments of the invention relate to a vehicle system, such as a train or other group of coupled rail vehicles. In one embodiment, the vehicle system includes a braking system according to one of the embodiments described herein. The vehicle system may include one or more of the following: at least one wheel (306), and/or at least one braking component configured to be associated with a vehicle wheel or an axle coupled to a vehicle wheel. In embodiments, the vehicle system may comprise at least one railway vehicle. Otherwise, the vehicles may also be more than one, and they may be associated therebetween in order to form a convoy of vehicles, such as a rail vehicle consist. In embodiments, however, the present invention may also be applicable to any type of vehicle. This may include, for example, railway vehicles/convoys, road vehicles, a car, a truck (for example a highway semi-trailer truck, a mining truck, a truck for transporting timber or the like) or similar, and the route may be, for example, a track, a road, or a trail.

According to one aspect, a snow-braking control solution improves the level of safety with which snow-brake braking is managed but without impacting the development costs of those systems that are responsible for managing service braking and emergency braking.

A degree of the actual braking (e.g., activation time and/or force applied by the at least one braking device to the vehicle system in response to the snow-braking application command generated by the first control circuit) may be determined using one or more braking force sensors, by measuring an operational response of the vehicle system to the snow-braking (e.g., a deceleration of the vehicle system as a function of vehicle system mass and time), by measuring an actual activation time of the snow-braking (e.g., using sensors that measure when the braking devices are actually activated), etc., including, in embodiments, taking into account vehicle environmental conditions such as wind resistance, wheel slip on the tracks or other route, etc.

In another embodiment, a braking control system for a vehicle system includes a first control circuit and a second control circuit. The first control circuit is configured to receive a first signal indicative of a requested braking application for mitigating ice and/or snow (e.g., reducing or preventing accumulation, and/or removing) on one or more of a wheel of the vehicle system or a braking component associated with the wheel of the vehicle system or associated with an axle coupled to the wheel of the vehicle system. The first control circuit is also configured to generate a second, command signal responsive to receiving the first signal. The second control circuit is configured to receive the command signal from the first control circuit, and to control a braking system of the vehicle system to apply a first designated degree (e.g., force and/or duration) of braking to the vehicle system to mitigate the ice and/or snow, responsive to receiving the command signal. The first control circuit is further configured to receive an actual braking signal that is indicative of an actual degree of braking that is applied by the braking system to the vehicle system in response to the command signal, to compare the actual degree of braking with the designated degree of braking, and to determine that the requested braking application has not been properly applied when the actual degree of braking does not correspond with the designated degree of braking (e.g., within designated parameters, such as within a threshold).

In another embodiment, the first control circuit is further configured, responsive to determining that the requested braking application has not been properly applied, to (i) generate a fault signal indicative that the requested braking application has not been properly applied, (ii) generate an emergency braking request signal for emergency braking of the vehicle system, and/or (iii) generate an additional command signal for the second control circuit to control the braking system to apply a second designated degree of braking to the vehicle system that is greater than the first designated degree of braking.

In another embodiment, the braking system includes plural braking units respectively operably coupled to plural vehicles of the vehicle system.

In another embodiment, the designated degree of braking includes at least one of a designated braking force or a designated braking duration, and the first control circuit is configured to determine that the requested braking application has not been properly applied when: an actual braking force of the actual degree of braking does not correspond with the designated braking force within a designated force threshold; and/or an actual braking duration of the actual degree of braking does not correspond with the designated braking duration within a designated time threshold.

In another embodiment, the first control circuit is further configured, responsive to determining that the requested braking application has not been properly applied, to (i) generate a fault signal indicative that the requested braking application has not been properly applied, (ii) generate an emergency braking request signal for emergency braking of the vehicle system, and/or (iii) generate an additional command signal for the second control circuit to control the braking system to apply a second designated degree of braking to the vehicle system that is greater than the first designated degree of braking.

Embodiments may be described in connection with a rail vehicle system, such as a locomotive or switcher, or other types of vehicle systems, such as automobiles, trucks (with or without trailers), buses, marine vessels, aircraft, unmanned aircraft (e.g., drones), mining vehicles, agricultural vehicles, or other off-highway vehicles. Vehicle systems described herein (rail vehicle systems or other vehicle systems that do not travel on rails or tracks) may be formed from a single vehicle or multiple vehicles. With respect to multi-vehicle systems, the vehicles may be mechanically coupled with each other (e.g., by couplers), or virtually or logically coupled but not mechanically coupled. For example, vehicles may be logically but not mechanically coupled when the separate vehicles communicate with each other to coordinate movements of the vehicles with each other so that the vehicles travel together (e.g., as a convoy, swarm, consist, platoon). Calculations and computations, such as navigation processes, may be performed on-board the vehicle systems or off-board the vehicle systems and then communicated to the vehicle systems. Whether on-board or off-board, a vehicle control system may operate a vehicle system and receive and process sensor inputs, operator inputs, operational parameters, vehicle parameters, and route parameters, etc.

Movement of a vehicle system may include propelling the vehicle forward or backward along a direction of travel, as well as slowing or stopping the vehicle. Movement further may include turning left or right, and increasing or decreasing elevation or depth. Movement further may include determining or setting a vehicle speed, changing a vehicle speed, and matching speeds and directions between vehicles in a vehicle group. Indirectly, movement of the vehicle may include ramping up (or down) power sources; and this may include energizing electrical circuits or buses, setting fuel flow rates, setting engine RPM rates, and the like.

The terms "control circuit" and "controller" are substitutable with each other and encompasses hardwired circuitry, programmable logic (such as microprocessors, microcontrollers, digital signal processors (DSPs), programmable logic devices (PLDs), programmable gate arrays (PGAs), or field-programmable gate arrays (FPGAs)), state machines, or firmware that executes stored instructions. Control circuits may form part of larger systems, such as integrated circuits (ICs), application-specific integrated circuits (ASICs), or systems-on-chips (SoCs), and may be found in devices such as computers, smartphones, wearable devices, and servers. These circuits may perform tasks involving data processing, communication, or data storage. Depicted components, functions, or operations may be implemented using hardware, software, firmware, or combinations of two or more thereof.

Instructions for implementing system features can be stored in various types of memory. Suitable memory may include dynamic random-access memory (DRAM), flash memory, and/or cache. These instructions can be distributed over a network or via other computer-readable media. The term "non-transitory computer-readable medium" refers to any physical medium capable of storing or transmitting instructions or information that can be read by a machine. Examples of suitable media include RAM, ROM, EPROM, EEPROM, magnetic or optical media, flash memory, or even propagated signals such as carrier waves or infrared signals.

In some embodiments, the control circuit can utilize machine learning (ML) techniques to make decisions based on sensor inputs or other data. Suitable ML methods may include supervised learning (with labeled inputs and outputs), unsupervised learning (for identifying patterns), or reinforcement learning (where the system adapts based on feedback). Suitable tasks for ML systems may involve classification, regression, clustering, anomaly detection, or optimization. ML may employ algorithms, such as decision trees, deep learning, support vector machines (SVMs), or neural networks, depending on the application. A suitable control circuit may incorporate a policy engine that applies specific rules based on equipment characteristics or environmental conditions. For instance, a neural network could process sensor data or operational inputs to determine appropriate actions. Techniques such as backpropagation or evolutionary strategies may be used to refine neural network parameters and optimize model selection for the given task.

In one embodiment, the control circuit (or controller) and system described herein may use machine learning to make determinations and to enable derivation-based learning outcomes. The system may communicate with a data collection system. The control circuit may learn from, model and make decisions/determinations on a set of data (including data provided by various sensors and data collection systems) by making data-driven predictions and adapting according to available data and modeling. Machine learning may involve performing tasks using supervised learning, unsupervised learning, and reinforcement learning systems. Supervised learning may use a set of example inputs and desired outputs to the machine learning systems, where unsupervised learning may use a learning algorithm that is structuring its input with, e.g., pattern detection and/or feature learning. Reinforcement learning may perform in a dynamic environment and then provide feedback about correct and incorrect decisions. Machine learning may include tasks based on certain outputs. These tasks may be machine learning problems such as classification, regression, clustering, density estimation, dimensionality reduction, anomaly detection, and the like to include other mathematical and statistical techniques. Suitable machine learning algorithmic types may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used for making determinations, calculations, comparisons and behavior analytics, and the like.

As mentioned above, the control circuit may include a policy engine. The policies the engine may apply can be based at least in part on characteristics of a given item of equipment or environment. For example, an artificial intelligence system, such as a neural network, can receive input of a number of environmental and task-related parameters. These parameters may include, for example, operational input of the given equipment, data from various sensors, environmental information, location and/or position data, and the like. The neural network can be trained and can generate an output based on these inputs, with the output representing an action or sequence of actions that the equipment or system should take to accomplish the goal of the operation. The control circuit can process the inputs through the parameters of the neural network to generate a value (i.e., make a determination) at the output node designating that action as the desired action, activity, or operating state. An action may translate into a signal that causes the vehicle to operate in a particular manner. The control circuit may accomplish this via back-propagation, feed forward processes, closed loop feedback, or open loop feedback, for example. Alternatively, rather than using backpropagation, the control circuit may use evolution strategies techniques to tune various parameters of the neural network. The control circuit may use neural network architectures that have a set of parameters representing weights of its node connections. A number of copies of this network can be generated and adjustments to the parameters can be made with subsequent simulations. Once the outputs from the various models have been obtained, they may be evaluated on their performance using a determined success metric. The best model or a good-enough model may be selected, and the control circuit can execute that plan to achieve the desired input data to mirror the predicted 'best outcome' scenario. Additionally, the success metric itself may be a combination of the optimized outcomes, which may be weighed relative to each other. Success metrics may be dynamically established, and the process re-run and the equipment directions further modified.

In one embodiment, data can be generated, transmitted, and stored and may involve one or both of a protected space data source and the exposed space data source. The control circuit may encrypt and decrypt data as needed at rest, during use, or in transit. Encryption keys and schema may be selected and implemented as informed by end use parameters and requirements. The control circuit may evaluate and/or identify a decision boundary (that is, a boundary that separates desired behavior from undesired behavior) with regard to that data. If the control circuit determines that some quantity of data is from a protected space data source and/or is operating within determined boundaries then the control circuit, and the equipment being controlled, may operate normally. However, if the data is determined to be from an exposed space data source and/or it crosses the decision boundary, the control circuit may respond. Suitable responses may be to power down determined equipment, signal an alert, run a diagnostic routine, perform a data backup (without overwriting existing backup data), isolate equipment (including by suspending some or all communication pathways), switch equipment or control operations to a safe mode of the control system, and/or initiate a safe mode state of the equipment (e.g., slow a vehicle to a safe and controlled stop). The safe mode may be, in one embodiment, a soft shutdown mode that it intended to avoid damage or injury based on the shutdown itself and in another embodiment may be a reboot and/or minimal reload of essential drivers and functionality.

In one embodiment, vehicle systems may implement secure authentication processes, encryption protocols, and firewalls to protect against unauthorized access or spoofing. A suitable control circuit may include a security module responsible for detecting and responding to suspicious activities, such as unapproved data access attempts or irregular communication patterns. This module may employ machine learning to adapt its defense strategies, learning from previous attacks and adjusting security measures as needed to prevent similar breaches.

Vehicle systems in various embodiments may use a combination of local and remote sensors to monitor environmental conditions, vehicle status, and external inputs. These sensors may detect parameters such as speed, acceleration, braking status, location, proximity to other objects or vehicles, ambient temperature, humidity, and lighting conditions, raw data gathered by these sensors may feed into the control circuit, which in turn can respond to the input. The responses may include dynamically adjusting vehicle operations in response to real-time or near real-time changes in the environment or vehicle parameters; and, processing the data for further analysis. In certain embodiments, sensors may utilize various types of communication protocols (e.g., Bluetooth, ZigBee, Wi-Fi, or cellular networks) to share data with control systems both within the vehicle and to external data processing centers.

In certain embodiments, maintenance and diagnostic functions may be integrated into the control circuit, enabling the system to self-monitor for operational health. The control circuit may utilize diagnostic algorithms to assess the status of various vehicle components, such as engines, brakes, batteries, fuel cells and fuel systems, propulsion systems, and electronic systems (if present). If a component is found to be underperforming or at risk of failure, the control circuit may schedule alerts, recommend maintenance, or initiate safety protocols to avoid catastrophic failure. Self-diagnostics may use historical performance data to identify trends, facilitating proactive rather than reactive maintenance.

Terms such as "processing," "computing," "calculating," or "determining" refer to operations carried out by the control circuit, which may include computing systems or electronic devices that manipulate data represented as physical (electronic) quantities within memory or registers. One or more components may be described as "configured to," "configurable to," "operable/operative to," "adapted/adaptable to," or similar terms. Unless explicitly stated, these terms encompass components in both active and inactive states. Unless stated otherwise, terms like "including" or "having" should be interpreted as open-ended (i.e., "including but not limited to"). Numeric claim recitations generally mean "at least" the stated number, and disjunctive terms like "A or B" should be interpreted to include either or both unless explicitly specified. Operations in any claim may generally be performed in any order unless explicitly stated. The recitation "at least one of A, B, and C" should be interpreted as any combination of A, B, and C, such A alone, B alone, C alone, A and B together, A and C together, B and C together, and/or A, B, and C together. The recitation "at least one of A, B, or C" should be interpreted to include A alone, B alone, C alone, A and B together, A and C together, B and C together, and/or A, B, and C together.

This written description may disclose several embodiments of the subject matter, including the best mode, and may enable one of ordinary skill in the relevant art to practice the embodiments of subject matter, including making and using any devices or systems and performing any incorporated methods. The patentable scope of the subject matter is defined by the claims, and may include other embodiments that may occur to one of ordinary skill in the art. Such other embodiments may be intended to be within the scope of the claims if they may have structural elements that may not differ from the literal language of the claims, or if they may include equivalent structural elements with insubstantial differences from the literal languages of the claims.

What is claimed is:

1. A braking control system for a vehicle system, comprising:

a first control circuit configured to:

receive a first signal indicative of a requested snow-braking application; and generate a snow-braking application command responsive to receiving the first signal; and a second control circuit configured to:

receive the snow-braking application command from the first control circuit;

control at least one braking device to apply the requested snow-braking application to the vehicle system, responsive to receiving the snow-braking application command;

wherein the first control circuit is further configured to:

receive an actual braking signal that is indicative of an actual braking that is applied by the at least one braking device to the vehicle system in response to the snow-braking application command generated by the first control circuit;

compare the actual braking that is indicated by the actual braking signal with the requested snow-braking application; and determine that the requested snow-braking application has not been properly applied when the actual braking indicated by the actual braking signal does not correspond with the requested snow-braking application.

2. The braking control system of claim 1, wherein the first control circuit is further configured to:

responsive to determining that the requested snow-braking application has not been properly applied, generate a fault signal indicative that the requested snow-braking application has not been properly applied, and/or generate an emergency braking request signal for emergency braking of the vehicle system.

3. The braking control system of claim 1, wherein the first control circuit is implemented according to a first safety integrity level and the second control circuit is implemented according to a second safety integrity level, wherein the first safety integrity level is greater than the second safety integrity level.

4. The braking control system of claim 1, wherein the first control circuit is distinct from the second control circuit.

5. The braking control system of claim 1, wherein the first control circuit and the second control circuit are comprised in a single control unit.

6. The braking control system of claim 1, wherein the first control circuit is configured to determine that the actual braking as indicated by the actual braking signal does not correspond with the requested snow-braking application when:

a first actual braking application intensity value differs from a second requested snow-braking application intensity value by at least a designated braking application intensity difference value; and/or a first actual braking application duration differs from a second requested snow-braking application duration by at least a designated braking application duration difference.

7. The braking control system of claim 1, wherein the first control circuit is also configured to control the application of emergency braking of the vehicle system.

8. The braking control system of claim 1, wherein the second control circuit is also configured to control the application of service braking of the vehicle system.

9. The braking control system of claim 1, wherein the first control circuit is configured to receive, via a communication system of the vehicle system, the first signal indicative of the requested snow-braking application from a third control circuit;

and wherein the communication system is configured for wired communications and/or wireless communications.

10. The braking control system of claim 9, wherein the third control circuit is configured to forward the first signal to the first control circuit when:

a driver of the vehicle system operates a designated snow-braking controller.

11. The braking control system of claim 9, wherein the third control circuit is configured to forward the first signal to the first control circuit when:

a monitoring system determines that there is ice and/or snow on the at least one braking device, or on a wheel of the vehicle system, or on a braking component associated with the wheel of the vehicle system or associated with an axle coupled to the wheel of the vehicle system.

12. The braking control system of claim 9, wherein the third control circuit is configured to forward the first signal to the first control circuit when:

a temperature sensor measures a temperature outside the vehicle system that is below a designated temperature threshold.

13. A rail vehicle comprising the at least one braking device and the braking control system of claim 1, wherein the at least one braking device is operably coupled to one or more of a wheel of the rail vehicle or an axle of the rail vehicle.

14. A vehicle system comprising:

a braking system; and a braking control system comprising:

a first control circuit configured to:

receive a first signal indicative of a requested snow-braking application; and generate a snow-braking application command responsive to receiving the first signal; and a second control circuit configured to:

receive the snow-braking application command from the first control circuit;

control the braking system to apply the requested snow-braking application to the vehicle system, responsive to receiving the snow-braking application command;

wherein the first control circuit is further configured to:

receive an actual braking signal that is indicative of an actual braking that is applied by the braking system to the vehicle system in response to the snow-braking application command generated by the first control circuit;

compare the actual braking that is indicated by the actual braking signal with the requested snow-braking application; and determine that the requested snow-braking application has not been properly applied when the actual braking indicated by the actual braking signal does not correspond with the requested snow-braking application.

15. A braking control system for a vehicle system, comprising:

a first control circuit configured to:

receive a first signal indicative of a requested braking application for mitigating ice and/or snow on one or more of a wheel of the vehicle system or a braking component associated with the wheel of the vehicle system or associated with an axle coupled to the wheel of the vehicle system; and generate a second, command signal responsive to receiving the first signal; and a second control circuit configured to:

receive the command signal from the first control circuit;

control a braking system of the vehicle system to apply a first designated degree of braking to the vehicle system to mitigate the ice and/or snow, responsive to receiving the command signal;

wherein the first control circuit is further configured to:

receive an actual braking signal that is indicative of an actual degree of braking that is applied by the braking system to the vehicle system in response to the command signal;

compare the actual degree of braking with the designated degree of braking; and determine that the requested braking application has not been properly applied when the actual degree of braking does not correspond with the designated degree of braking.

16. The braking control system of claim 15, wherein the first control circuit is further configured, responsive to determining that the requested braking application has not been properly applied, to (i) generate a fault signal indicative that the requested braking application has not been properly applied, (ii) generate an emergency braking request signal for emergency braking of the vehicle system, and/or (iii) generate an additional command signal for the second control circuit to control the braking system to apply a second designated degree of braking to the vehicle system that is greater than the first designated degree of braking.

17. The braking control system of claim 15, wherein the braking system comprises plural braking units respectively operably coupled to plural vehicles of the vehicle system.

18. The braking control system of claim 15, wherein the designated degree of braking includes at least one of a designated braking force or a designated braking duration, and the first control circuit is configured to determine that the requested braking application has not been properly applied when: an actual braking force of the actual degree of braking does not correspond with the designated braking force within a designated force threshold; and/or an actual braking duration of the actual degree of braking does not correspond with the designated braking duration within a designated time threshold.

19. The braking control system of claim 18, wherein the first control circuit is further configured, responsive to determining that the requested braking application has not been properly applied, to (i) generate a fault signal indicative that the requested braking application has not been properly applied, (ii) generate an emergency braking request signal for emergency braking of the vehicle system, and/or (iii) generate an additional command signal for the second control circuit to control the braking system to apply a second designated degree of braking to the vehicle system that is greater than the first designated degree of braking.

20. A rail vehicle system having one or more rail vehicles coupled together to travel along a track, wherein the rail vehicle system comprises the braking control system of claim 15.

* * * * *